United States Patent
Bourge et al.

(10) Patent No.: US 11,128,824 B2
(45) Date of Patent: Sep. 21, 2021

(54) METHOD AND DEVICE FOR ESTIMATING NOISE LEVEL OF DARK REFERENCE ROWS OF AN IMAGE SENSOR

(71) Applicant: STMICROELECTRONICS SA, Montrouge (FR)

(72) Inventors: Arnaud Bourge, Paris (FR); Antoine Drouot, Paris (FR); Gwladys Hermant, Paris (FR)

(73) Assignee: STMICROELECTRONICS SA, Montrouge (FR)

( * ) Notice: Subject to any disclaimer, the term of this patent is extended or adjusted under 35 U.S.C. 154(b) by 105 days.

(21) Appl. No.: 16/711,198

(22) Filed: Dec. 11, 2019

(65) Prior Publication Data

US 2020/0195866 A1 Jun. 18, 2020

(30) Foreign Application Priority Data

Dec. 12, 2018 (FR) ...................... 1872788

(51) Int. Cl.
*H04N 5/361* (2011.01)
*H04N 5/217* (2011.01)
*H04N 5/232* (2006.01)

(52) U.S. Cl.
CPC ........... *H04N 5/361* (2013.01); *H04N 5/2176* (2013.01); *H04N 5/23229* (2013.01)

(58) Field of Classification Search
CPC .. H04N 5/361; H04N 5/2176; H04N 5/23229; H04N 5/357
See application file for complete search history.

(56) References Cited

U.S. PATENT DOCUMENTS

| | | | | |
|---|---|---|---|---|
| 2008/0218615 A1* | 9/2008 | Huang | ................. | H04N 5/2176 348/294 |
| 2009/0046180 A1* | 2/2009 | Shibano | ................. | H04N 5/361 348/243 |
| 2010/0073516 A1* | 3/2010 | Minakuti | ............... | H04N 5/361 348/229.1 |
| 2011/0157434 A1* | 6/2011 | Gerstenberger | ..... | H04N 5/3658 348/243 |
| 2012/0212657 A1* | 8/2012 | Mo | ........................ | H04N 5/361 348/300 |
| 2015/0163424 A1* | 6/2015 | Morino | ................. | H04N 5/361 348/243 |
| 2020/0045258 A1* | 2/2020 | Ishii | ...................... | H04N 5/361 |

(Continued)

FOREIGN PATENT DOCUMENTS

| | | |
|---|---|---|
| EP | 1 289 309 A1 | 3/2003 |
| EP | 2 835 963 A1 | 2/2015 |

*Primary Examiner* — Nhan T Tran
(74) *Attorney, Agent, or Firm* — Seed IP Law Group LLP (57) ABSTRACT

A system has an array of pixels including a plurality of active pixels and a plurality of dark reference pixels and processing circuitry coupled to the array of pixels. The processing circuitry sequentially computes, for each of a plurality of pairs of sets of dark reference pixels of the plurality of dark reference pixels, absolute differences in dark signal levels of the pair of sets of dark reference pixels. The absolute differences in dark signal levels are accumulated and a noise level of the dark reference pixels of the array of pixels is estimated based on the accumulated absolute differences. The system may be employed in, for example, a back-up camera of an automobile or a mobile phone.

30 Claims, 5 Drawing Sheets

(56) References Cited

U.S. PATENT DOCUMENTS

2020/0099875 A1\* 3/2020 Mikes .................... H04N 5/361
2020/0221043 A1\* 7/2020 Sato ...................... H04N 5/361
2021/0144326 A1\* 5/2021 Sato ................... H04N 5/37457

\* cited by examiner

METHOD AND DEVICE FOR ESTIMATING NOISE LEVEL OF DARK REFERENCE ROWS OF AN IMAGE SENSOR

BACKGROUND

Technical Field

Modes of implementation and embodiments of the disclosure relate to image sensors and to image signal processing, and more particularly to estimations of noise levels of image sensors.

Description of the Related Art

In a general manner, an image sensor comprises so-called active rows, comprising active pixels, and configured to measure levels of brightness and color of light radiations received by the image sensor so as thereafter to form images taken by the image sensor, and dark reference rows comprising dark pixels covered and plunged in darkness.

Each dark pixel delivers an electrical signal, termed a dark signal, comprising a continuous component, stated otherwise an intensity in the dark, and a random component, stated otherwise a noise level.

In order to estimate the said noise level of the image sensor in the dark, a conventional approach comprises computing the standard deviation of the values of dark signals of all the dark pixels of the image sensor.

However, such an estimation generally demands relatively significant computation power since the computation of the standard deviation requires several memory lines and two computation passes: a first computation pass to compute the average of the values of all the pixels in the dark reference rows of the image sensor, and a second computation pass to compute the square deviations of each dark pixel from the said computed average.

The result of such an estimation will therefore be available after a certain lag, and is moreover sensitive to defective pixels (defects) whose value deviates excessively from the average (outliers).

An alternative conventional approach consists in using a determined noise model to estimate such noise levels of the image sensor.

This approach generally requires a temperature sensor so as to measure the global temperature of the image sensor and a few determined/calibrated parameters to undertake the computation of the noise model.

The result of the estimation according to this alternative approach depends on the precision of the noise model used and the determined/calibrated parameters but not on measured values of the pixels of the image sensor. Consequently, this approach using the noise model is less robust to manufacturing variations of image sensors.

BRIEF SUMMARY

An embodiment provides a low complexity method and device to estimate in a fast manner a noise level of an image sensor via dark reference rows of the image sensor while remaining robust to manufacturing variations from item to item and with reduced sensitive to possible defective pixels in the dark reference rows.

According to one aspect, there is proposed a method for estimating a noise level of dark reference rows comprising pixels each delivering a dark signal. The method comprises sequential computations of absolute differences between levels of dark signals of the adjacent pixels taken pairwise in at least part, and optionally the entirety, of the said pixels of the dark reference rows, on completion of each sequential computation, sequential accumulation of the computed absolute difference, and estimation of the said noise level as a function of the result of the said accumulation.

Such an estimation method based on a simple and fast computation of the accumulation of the absolute differences of the levels of dark signals of the adjacent pixels taken pairwise in at least part of the said pixels of the dark reference rows advantageously facilitates avoiding use of memory lines and of the two-pass processings which are not only expensive at the level of the processing time but also demanding at the level of the computation power.

Moreover, as it takes into account only the absolute differences of the levels of dark signals of the adjacent pixels instead of the standard deviation of the levels of dark signals as proposed in conventional approaches, the result of such an estimation in an embodiment is by design less influenced by possible defective pixels.

Advantageously, the estimation according to such a method in an embodiment is intrinsically robust to variations from item to item since this estimation is carried out on the basis of the real measurements of the values of the pixels or macro-pixels in the dark rows of the sensor itself.

The estimated noise level may for example be equal or proportional to the result of the said accumulation.

Here again, the result of this estimation may advantageously be used in an embodiment as an input parameter for the computation of a noise model of an image sensor so as to improve the precision of the said noise model.

According to one mode of implementation, each sequential computation comprises storage of the level of a first pixel, and computation of the absolute difference between the level of a second pixel adjacent to the first pixel and the stored level of the first pixel.

The second pixel of the current sequential computation is the first pixel of the following sequential computation.

In an embodiment, such a method advantageously allows sequential computations of the absolute differences of the levels of the adjacent pixels taken pairwise in at least part of the said pixels of the dark reference rows.

According to another mode of implementation, the dark rows comprise pixel portions each defining a channel of pixels of the dark reference rows, and the first pixel and the second pixel belong to one and the same channel of pixels.

Therefore, in an embodiment it is advantageously possible to compute noise levels for each channel of pixels.

The estimation of the said noise level of the dark reference rows may for example comprise for each portion of the dark reference rows, estimation of a noise level of the corresponding channel of pixels, and estimation of the said noise level of the dark rows as a function of the noise levels of the corresponding channels of pixels.

As a variant, instead of operating on adjacent pixels, it is possible to operate on adjacent groups corresponding to several pixels.

Thus, according to another aspect, there is proposed a method for estimating a noise level of dark reference rows of an image sensor, the dark reference rows comprising groups of pixels, each pixel delivering a dark signal, the method comprising sequential computations of absolute differences between sums of levels of dark signals of the pixels of the adjacent groups taken pairwise in at least part of the said groups of pixels of the dark reference rows, on completion of each sequential computation, sequential accumulation of the computed absolute difference, and estimation of the said noise level as a function of the result of the said accumulation.

According to one mode of implementation, each sequential computation comprises storage of the sum of levels of the pixels of a first group, and computation of the absolute difference between the sum of the levels of the pixels of a second group adjacent to the first group and the stored sum of the first group.

The second group of the current sequential computation is the first group of the following sequential computation.

According to another mode of implementation, the dark rows comprise group portions each defining a channel of pixels of the dark reference rows, and the first group and the second group belong to one and the same channel of pixels.

According to yet another mode of implementation, the estimation of the said noise level of the dark reference rows comprises for each portion of the dark reference rows, estimation of a noise level of the corresponding channel of pixels, and estimation of the said noise level of the dark rows as a function of the noise levels of the corresponding channels of pixels.

Each group of pixels may for example comprise at least two pixels and the sum of the levels of dark signals of the pixels of each group may for example be the sum of the levels of dark signals of the said at least two pixels.

By way of nonlimiting indication, the said estimation of the noise level may for example comprise computation, on the basis of the said accumulation, of the average of the computed absolute differences.

According to another aspect, there is proposed a device for estimating a noise level of dark reference rows comprising pixels each delivering a dark signal, and processing means configured to sequentially compute absolute differences between levels of dark signals of the adjacent pixels taken pairwise in at least part of the said pixels of the dark reference rows, sequentially accumulate, on completion of each sequential computation, the computed absolute difference, and estimate the said noise level as a function of the average of the computed absolute differences.

According to one embodiment, the processing means are configured to, for each sequential computation, store the level of a first pixel, and compute the absolute difference between the level of a second pixel adjacent to the first pixel and the stored level of the first pixel.

The second pixel of the current sequential computation is the first pixel of the following sequential computation.

According to another embodiment, in which the image sensor is a color image sensor, each portion defines a channel of pixels of the dark reference rows, and the first pixel and the second pixel belong to one and the same channel of pixels.

According to yet another embodiment, for the estimation of the said noise level of the dark reference rows, the processing means are configured to, for each portion of the dark reference rows, estimate a noise level of the corresponding channel of pixels, and estimate the said noise level of the dark rows as a function of the noise levels of the corresponding channels of pixels.

According to another aspect, there is proposed a device for estimating a noise level of dark reference rows of an image sensor, the dark reference rows comprising groups of pixels, each pixel delivering a dark signal, and processing means configured to sequentially compute absolute differences between levels of dark signals of the pixels of the adjacent groups taken pairwise in at least part of the said groups of pixels of the dark reference rows and estimate the said noise level as a function of the result of the said accumulation.

According to one embodiment, the processing means are configured to, for each sequential computation, store the sum of levels of the pixels of a first group, and compute the absolute difference between the sum of the levels of the pixels of a second group adjacent to the first group, and the stored sum of the first group.

The second group of the current sequential computation is the first group of the following sequential computation.

According to another embodiment, each portion defines a channel of pixels of the dark reference rows, and the first pixel and the second pixel belong to one and the same channel of pixels.

According to yet another embodiment, for the estimation of the said noise level of the dark reference rows, the processing means are configured to, for each portion of the dark reference rows, estimate a noise level of the corresponding channel of pixels, and estimate the said noise level of the dark rows as a function of the noise levels of the corresponding channels of pixels.

Each group of pixels may for example comprise at least two pixels and the sum of the levels of dark signals of the pixels of each group may for example be the sum of the levels of dark signals of the said at least two pixels.

By way of nonlimiting example, the processing means of the devices such as defined hereinabove may furthermore be configured to compute, on the basis of the said accumulation, the average of the computed absolute differences.

By way of nonlimiting indication, the said devices such as defined hereinabove may for example be embodied in an integrated manner.

According to another aspect, there is proposed an image sensor comprising dark reference rows and a device such as defined hereinabove.

According to another aspect, there is proposed an electronic apparatus, for example of the backup camera, tablet or cellular mobile telephone type, incorporating at least one image sensor such as defined hereinabove.

According to yet another aspect, there is proposed an automotive vehicle comprising at least one image sensor such as defined hereinabove.

In an embodiment, a method, comprises: sequentially computing, for each of a plurality of pairs of sets of dark reference pixels of an image sensor, absolute differences in dark signal levels of the pair of sets of dark reference pixels; accumulating the absolute differences in dark signal levels; and estimating a noise level of the dark reference pixels of the image sensor based on the accumulated absolute differences. In an embodiment, a first pair of sets of dark reference pixels of the plurality of pairs of sets of dark reference pixels consists of two dark reference pixels. In an embodiment, the two dark reference pixels are adjacent. In an embodiment, the method comprises: storing an absolute value of a darkness level of a first pixel of the two dark reference pixels; computing an absolute difference between a darkness level of a second pixel of the two dark reference pixels and the stored absolute value of the darkness level of the first pixel of the two dark reference pixels; and initializing the accumulated absolute differences to the computed absolute difference between the darkness level of the second pixel of the two dark reference pixels and the stored darkness level of the first pixel of the two dark reference pixels. In an embodiment, a second pair of sets of dark reference pixels of the plurality of pairs of sets of dark reference pixels consists of the second reference pixel of the first pair of sets of dark reference pixels and a third dark reference pixel, the third dark reference pixel being adjacent to the second reference pixel of the first pair of sets of dark reference pixels. In an embodiment, the method comprises: storing an absolute value of a darkness level of the second pixel of the two dark reference pixels; computing an absolute difference between a darkness level of the third dark reference pixel and the stored absolute value of the darkness level of the second pixel of the two dark reference pixels; and updating the accumulated absolute differences based on the computed absolute difference between the darkness level of the third dark reference pixel and the stored absolute value of the darkness level of the second pixel of the two dark reference pixels. In an embodiment, a first pair of sets of dark reference pixels of the plurality of pairs of sets of dark reference pixels comprises a first group of two or more dark reference pixels and a second group of two or more dark reference pixels. In an embodiment, the second group of dark reference pixels is adjacent to the first group of dark reference pixels. In an embodiment, a second pair of sets of dark reference pixels comprises the second group of dark reference pixels and a third group of two or more dark reference pixels, the third group of dark reference pixels being adjacent to the second group of dark reference pixels. In an embodiment, the dark reference pixels of the image sensor are organized into a plurality of pixel channels and the method comprises estimating respective noise levels of the plurality of pixel channels, wherein the estimated noise level of the dark reference pixels of the image sensor is based on the estimated respective noise levels of the plurality of pixel channels. In an embodiment, after each computing of absolute differences in dark signal levels of a pair of sets of dark reference pixels, the accumulated absolute differences are updated. In an embodiment, the method comprises determining an average of the accumulated absolute differences in dark signal levels.

In an embodiment, an image sensor comprises: a plurality of active pixels; a plurality of dark reference pixels; and processing circuitry coupled to the plurality of dark reference pixels, wherein the processing circuitry, in operation: sequentially computes, for each of a plurality of pairs of sets of dark reference pixels of the plurality of dark reference pixels, absolute differences in dark signal levels of the pair of sets of dark reference pixels; accumulates the absolute differences in dark signal levels; and estimates a noise level of the dark reference pixels of the image sensor based on the accumulated absolute differences. In an embodiment, a first pair of sets of dark reference pixels of the plurality of pairs of sets of dark reference pixels consists of two dark reference pixels. In an embodiment, the two dark reference pixels are adjacent. In an embodiment, the processing circuitry, in operation: stores an absolute value of a darkness level associated with a first set of a first pair of sets of dark reference pixels; computes an absolute difference between a darkness level associated with a second set of the first pair of sets of dark reference pixels and the stored absolute value associated with of the darkness level of the first set of dark reference pixels; and initializes the accumulated absolute differences to the computed absolute difference between the darkness level associated with the second set of the first pair of sets of dark reference pixels and the stored darkness level of the first set of dark reference pixels. In an embodiment, a first pair of sets of dark reference pixels of the plurality of pairs of sets of dark reference pixels comprises a first group of two or more dark reference pixels and a second group of two or more dark reference pixels. In an embodiment, the second group of dark reference pixels is adjacent to the first group of dark reference pixels. In an embodiment, a second pair of sets of dark reference pixels comprises the second group of dark reference pixels and a third group of two or more dark reference pixels, the third group of dark reference pixels being adjacent to the second group of dark reference pixels. In an embodiment, the processing circuitry, in operation: stores a sum of dark signal levels of the pixels of the first group of dark reference pixels; and computes an absolute difference between a sum of dark signal levels of the pixels of the second group of dark reference pixels and the stored sum of the dark signal levels of the first group of dark reference pixels. In an embodiment, the dark reference pixels of the image sensor are organized into a plurality of pixel channels and the processing circuitry, in operation, estimates respective noise levels of the plurality of pixel channels, and the estimated noise level of the dark reference pixels of the image sensor is based on the estimated respective noise levels of the plurality of pixel channels. In an embodiment, after each computing of absolute differences in dark signal levels of a pair of sets of dark reference pixels, the processing circuitry, in operation, updates the accumulated absolute differences. In an embodiment, the processing circuitry, in operation, determines an average of the accumulated absolute differences in dark signal levels. In an embodiment, the image sensor is a color image sensor.

In an embodiment, a system comprises: an array of pixels including a plurality of active pixels and a plurality of dark reference pixels; and processing circuitry coupled to the array of pixels, wherein the processing circuitry, in operation: sequentially computes, for each of a plurality of pairs of sets of dark reference pixels of the plurality of dark reference pixels, absolute differences in dark signal levels of the pair of sets of dark reference pixels; accumulates the absolute differences in dark signal levels; and estimates a noise level of the dark reference pixels of the array of pixels based on the accumulated absolute differences. In an embodiment, a first pair of sets of dark reference pixels of the plurality of pairs of sets of dark reference pixels consists of two dark reference pixels. In an embodiment, a first pair of sets of dark reference pixels of the plurality of pairs of sets of dark reference pixels comprises a first group of two or more dark reference pixels and a second group of two or more dark reference pixels. In an embodiment, the dark reference pixels of the array of pixels are organized into a plurality of pixel channels and the processing circuitry, in operation, estimates respective noise levels of the plurality of pixel channels, and the estimated noise level of the dark reference pixels of the array of pixels is based on the estimated respective noise levels of the plurality of pixel channels. In an embodiment, the system comprises a back-up camera having an integrated circuit including the array of pixels and the processing circuitry. In an embodiment, the system comprises a mobile phone having an integrated circuit including the array of pixels and the processing circuitry.

BRIEF DESCRIPTION OF THE SEVERAL VIEWS OF THE DRAWINGS

Other advantages and characteristics of the disclosure will become apparent on examining the detailed description of wholly non-limiting modes of implementation and embodiments and the appended drawings in which.

DETAILED DESCRIPTION

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, image sensors, pixels, multipliers, adders, dividers, comparators, memory cells, integrated circuits, logic gates, finite state machines, convolutional accelerators, memory arrays, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one aspect," "an aspect," "one embodiment," or "an embodiment" means that a particular feature, structure or characteristic described in connection with the embodiment is included in at least one embodiment. Thus, the appearances of the phrases "in one aspect," "in an aspect," "in one embodiment," or "in an embodiment," etc., in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Figure 1:
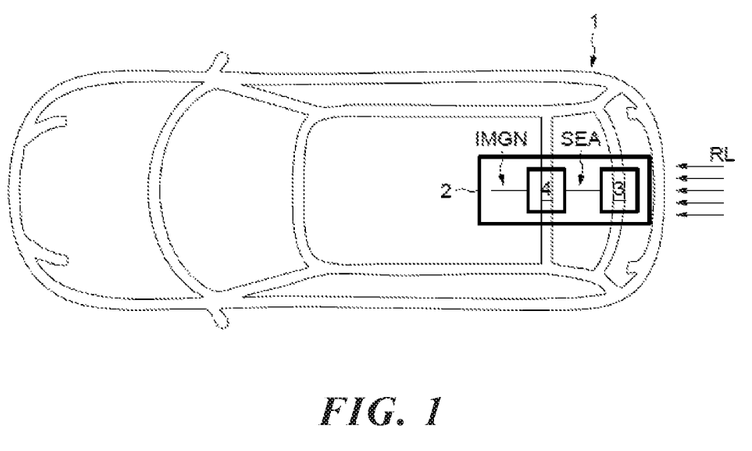
FIG. 1 is a functional block diagram of an embodiment of an automobile in accordance with the disclosure.

The reference 1 in FIG. 1 designates an automotive vehicle, here for example a car 1, comprising in its rear part a backup camera 2 configured to allow the driver of the car 1 to have visibility as regards what is happening at the rear of the car 1 when the car 1 is reversing.

The backup camera 2 comprises an image sensor 3 configured to receive light radiations RL and convert these light radiations RL into analog electrical signals SEA, and a processing module or circuit 4 configured to form digital images IMGN on the basis of the analog electrical signals SEA.

Figure 2:
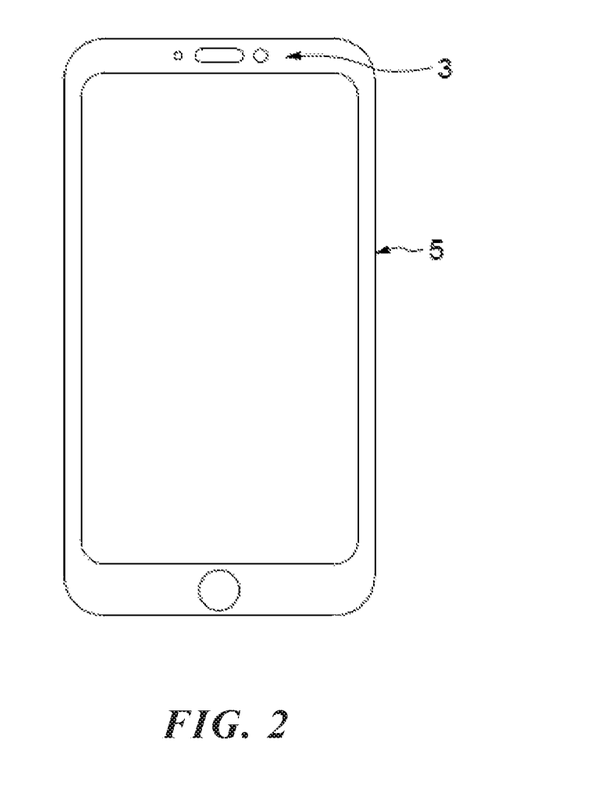
FIG. 2 is a functional block diagram of an embodiment of an electronic apparatus in accordance with the disclosure.

The reference 5 in FIG. 2 designates an electronic apparatus, here for example a cellular mobile telephone, incorporating in its front face an image sensor 3 intended to take for example images of the user of the telephone 5. The electronic apparatus 5 generally comprises a processor or processing circuitry (see processing circuit 4 of FIG. 1) to process signals generated by the image sensor 3.

Figure 3:
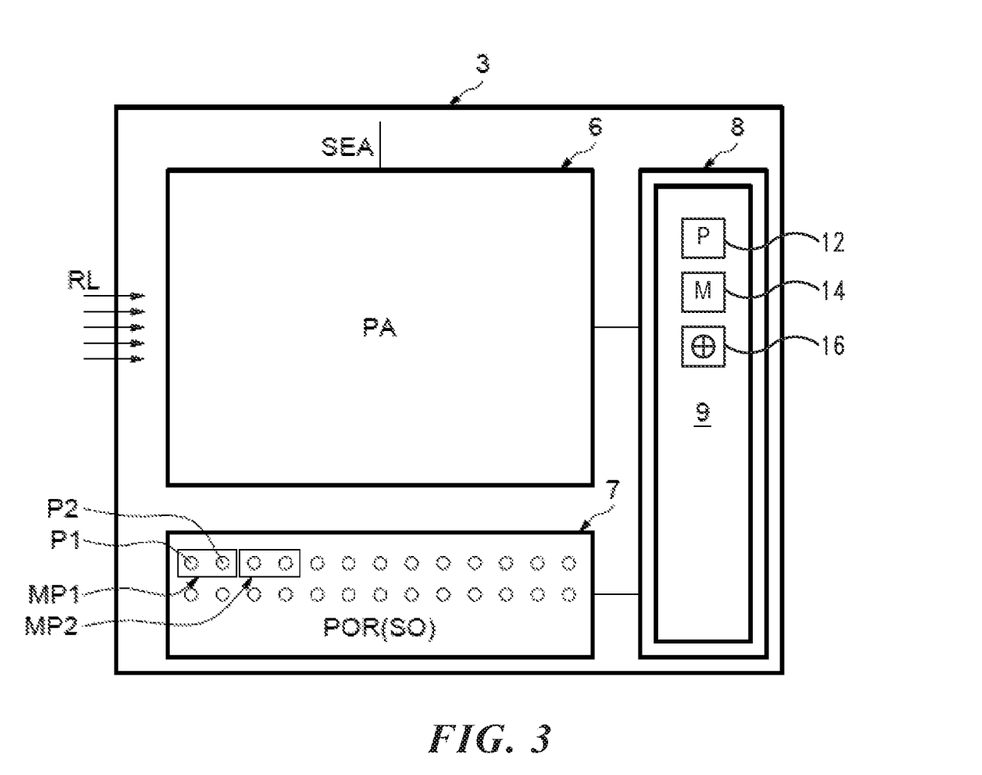
FIG. 3 schematically illustrates an embodiment of an image sensor in accordance with the disclosure.

Reference is now made to FIG. 3 to illustrate in greater detail an exemplary embodiment of an image sensor 3 that may be employed, for example, in the embodiments of FIGS. 1 and 2.

The image sensor 3 comprises active rows 6, dark reference rows 7, and a device or circuitry 8, which, in operation, estimates a noise level and which is coupled to the dark reference rows 7.

The active rows 6, the dark reference rows 7 and the circuit to estimate a noise level 8 are here for example embodied in an integrated manner.

The sensor 3 comprises here for example 1080 active rows 6 comprising so-called active pixels PA. Each row 6 comprises here for example 1920 active pixels PA.

All the active pixels PA are configured to receive light radiations RL and convert the light radiations RL into analog electrical signals SEA.

The dark reference rows 7 are configured to be situated in proximity to the active rows 6 and comprise a few rows, here for example 10 rows, of dark reference pixels POR. Each dark reference row 7 comprises for example also 1920 dark reference pixels POR.

All the dark reference pixels POR are configured to be covered and plunged in darkness. As the dark reference pixels POR and the active pixels PA are formed in the same way, their technical characteristics are similar. Each pixel POR is configured to deliver a dark signal SO.

Consequently, the noise, stated otherwise the random variations of levels of the dark signals SO of the dark reference pixels POR, approximately represent the noise of the active pixels PA of the active rows 6 as well as the noise of the image sensor 3.

The device for estimating noise level 8 comprises processing circuitry 9, here for example in the form of an image processor of application-specific integrated circuit type, commonly known to the person skilled in the art by the English acronym ASIC, which are coupled to the dark reference rows 7. The circuitry 9 comprises one or more processing cores 12, one or more memories 14 (e.g., one or more registers, memory cells, memory arrays, etc) and discrete circuitry 16 (e.g., one or more adders, accumulators, etc.), and various combinations thereof.

The device 8 is configured to estimate a noise level of the dark reference rows 7, stated otherwise a noise level of the image sensor 3, on the basis of levels of dark signals SO of at least part of the dark reference pixels POR.

For example, the device 8 may be coupled to a processor of a system employing the image sensor 3, such as the processing module or circuit 4 of FIG. 1, and configured to deliver the estimated noise level to the processing module 4.

It should be noted that this estimated noise level can advantageously be used as an input parameter for the computation of a noise model performed by the processing model or circuit 4 so as to improve the quality of images taken by the active rows 6.

In order to determine the noise level of the dark reference rows 7, the processing circuitry 9 of the device 8 is configured to sequentially compute absolute differences between levels of dark signals SO of the adjacent pixels taken pairwise in at least part of the said pixels, here for example the entirety of the pixels, of the dark reference rows 7, sequentially accumulate, on completion of each sequential computation, the computed absolute difference, and estimate the said noise level as a function of the result of the said accumulation.

It should be noted that in an embodiment the estimation of the said noise level is based on the computations of the absolute differences and the accumulation of the computed absolute differences but not on computations of standard deviation and requires only one computation pass. The speed of this estimation is therefore faster with respect to a conventional approach requiring at least two computation passes.

Moreover, by virtue of the use of sequential accumulation, no memory line is needed for storing numerous intermediate parameters. The complexity of the processing circuitry 9 may therefore advantageously be reduced.

By way of nonlimiting example, the processing circuitry 9 can also be configured to take into account only part, for example half, of the pixels of the dark reference rows 7 so as to further reduce the processing time.

It should be noted that the pixels POR of the dark reference rows 7 can also be partitioned into several groups of pixels GP1, GP2 each comprising at least two pixels, here for example each pixel group GP1 comprising two pixels POR1, POR2.

In that case, the processing circuitry 9 of the device 8 may be configured to sequentially compute absolute differences between sums of levels of dark signals SO of the pixels of the adjacent groups GP1, GP2 taken pairwise in at least part of the said groups, here for example the entirety of the groups of pixels GP1, of pixels of the dark reference rows 7, sequentially accumulate, on completion of each sequential computation, the computed absolute difference, and estimate the said noise level as a function of the result of the said accumulation.

Advantageously, the influence of one or of possible defective pixels in one or more groups of pixels may be reduced since the said noise level is computed on the basis of the sums of levels of dark signals of the pixels in a group of pixels instead of the levels of dark signals of the pixels.

Figure 4:
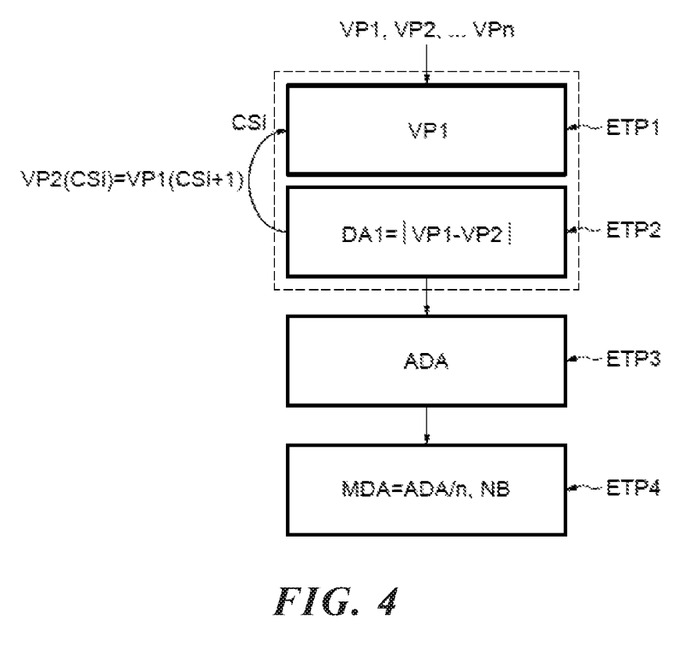
FIG. 4 schematically illustrates an embodiment of a method in accordance with the disclosure.

Reference is now made to FIG. 4 to illustrate in greater detail an exemplary implementation of the device or circuit for estimating noise level 8.

In this example, the processing circuitry 9 are configured to perform sequential computations CSi of the absolute differences between levels of dark signals SO of the adjacent pixels taken pairwise in at least part, here for example the entirety, of the pixels of the dark reference rows 7.

The sequential computations CSi are repeated until the absolute differences between levels of dark signals of the adjacent pixels taken pairwise in the said at least part are computed.

Each sequential computation CS comprises a first step ETP1, and a second step ETP2.

In the first step ETP1, the processing circuitry 9 is configured to store the level VP1 of the dark signal of a first pixel POR1 in the said at least part of the pixels of the dark reference rows 7 (FIG. 3).

In the second step ETP2, the processing circuitry 9 is configured to compute a first absolute difference DA1 between the level VP2 (FIG. 3) of the dark signal of a second pixel POR2 adjacent to the first pixel POR1 and the stored value VP1 of the first pixel POR1.

It should be noted that the level VP2 of the dark signal of the second pixel of each current sequential computation CSi is stored in the first step ETP1 of the following sequential computation CSi+1 as the level VP1 of the dark signal of the first pixel.

The processing circuitry 9 is furthermore configured to perform an accumulation ADA (ETP3) of the absolute difference DAi, i=1, 2, 3 . . . n computed on completion of each sequential computation CSi, and compute the average MDA (ETP4) of the absolute differences DA1 to DAn on the basis of the accumulation ADA of the absolute differences DA1 to DAn so as to estimate the noise level NB of the image sensor 3.

By way of nonlimiting example, the average MDA of the absolute differences DA1 to DAn can be obtained by the accumulation ADA of the absolute differences DA1 to DAn, divided by the number n of absolute differences DA1 to DAn, stated otherwise MDA=ADA/n.

The level of the dark signal of a defective pixel is generally higher with respect to those of the normal pixels. An estimation of noise level based on the standard deviation of the values of pixels in the dark reference rows 7 further amplifies the influence of the defective pixel.

As the noise level estimation proposed here is based on the average MDA of the absolute differences DA1 to DAn between the levels of dark signals of the pixels taken pairwise in at least part of the pixels of the dark reference rows 7, the influence of the defective pixel or pixels is therefore reduced in an embodiment.

Thus, the estimated noise level NB is more robust in an embodiment in relation to possible defective pixels in the dark reference rows 7.

It should be noted that a sequential computation of the said noise level on the basis of the sums of the levels of dark signals of the pixels of groups of pixels is similar to that illustrated in FIG. 4 except that sums of levels of dark signals of the pixels of each group of pixels is computed.

For the sake of simplification, the method of a sequential computation of the absolute differences between sums of levels of dark signals of the pixels of the adjacent groups taken pairwise in at least part of the said groups of pixels of the dark reference rows is not illustrated.

Figure 5:
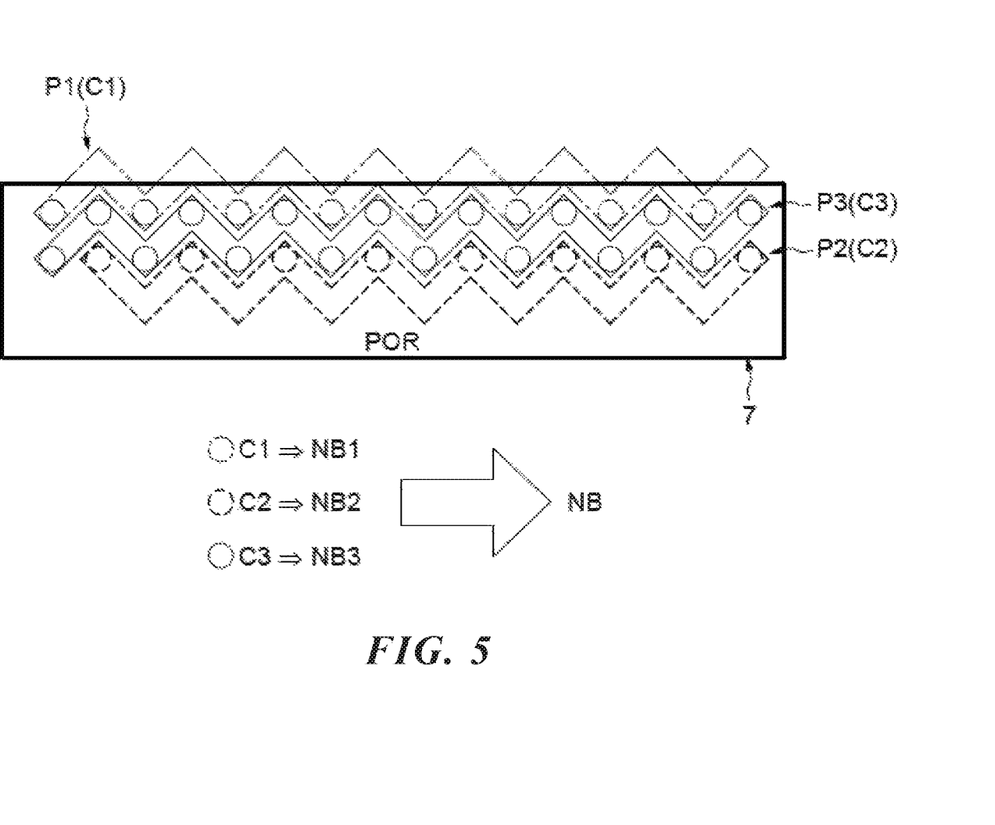
FIG. 5 schematically illustrates an embodiment of channels of dark pixels of an image sensor in accordance with the disclosure.

Reference is now made to FIG. 5 to illustrate another exemplary implementation of the device for estimating noise level 8.

In this example, the dark rows 7 comprise portions of pixels, here for example a first portion of pixels P1, a second portion of pixels P2, and a third portion of pixels P3, each defining a channel of pixels C1, C2, C3 of the dark reference rows 7.

Stated otherwise, each portion of pixels P1, P2, P3 represents a channel of pixels C1, C2, C3.

For example, according to the pattern of a Bayer matrix (also called a "Bayer Filter") known to the person skilled in the art, the odd pixels of each odd row belong to a first channel of pixels C1, the even pixels of each even row belong to a second channel of pixels C2, and the even pixels of each odd row and the odd pixels of each even row belong to a third channel of pixels C3.

In that case, the processing circuitry 9 is configured to compute respectively noise levels of these channels of pixels NB1, NB2, NB3 as a function of the average of the absolute differences corresponding respectively to these channels of pixels C1, C2, C3.

The computation of the said averages may be, for example, identical to that illustrated with FIG. 3.

The processing circuitry 9 is thereafter configured to estimate the said noise level NB of the dark reference rows 7 as a function of the noise levels of the channels of pixels NB1, NB2, NB3.

By way of nonlimiting example, the noise level NB of the dark reference rows 7 may for example be estimated by computing the average of the noise levels of the channels of pixels NB1, NB2, NB3, stated otherwise NB=(NB1+NB2+NB3)/3.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sequentially computing, for each of a plurality of pairs of sets of dark reference pixels of an image sensor, absolute differences in dark signal levels of the plurality of pairs of sets of dark reference pixels;
accumulating the absolute differences in dark signal levels; and
estimating a noise level of the dark reference pixels of the image sensor based on the accumulated absolute differences.

2. The method of claim 1 wherein a first pair of sets of dark reference pixels of the plurality of pairs of sets of dark reference pixels consists of two dark reference pixels.

3. The method of claim 2 wherein the two dark reference pixels are adjacent.

4. The method of claim 3, comprising:
storing an absolute value of a darkness level of a first pixel of the two dark reference pixels;
computing an absolute difference between a darkness level of a second pixel of the two dark reference pixels and the stored absolute value of the darkness level of the first pixel of the two dark reference pixels; and
initializing the accumulated absolute differences to the computed absolute difference between the darkness level of the second pixel of the two dark reference pixels and the stored darkness level of the first pixel of the two dark reference pixels.

5. The method of claim 4 wherein a second pair of sets of dark reference pixels of the plurality of pairs of sets of dark reference pixels consists of the second reference pixel of the first pair of sets of dark reference pixels and a third dark reference pixel, the third dark reference pixel being adjacent to the second reference pixel of the first pair of sets of dark reference pixels.

6. The method of claim 5, comprising:
storing an absolute value of a darkness level of the second pixel of the two dark reference pixels;
computing an absolute difference between a darkness level of the third dark reference pixel and the stored absolute value of the darkness level of the second pixel of the two dark reference pixels; and
updating the accumulated absolute differences based on the computed absolute difference between the darkness level of the third dark reference pixel and the stored absolute value of the darkness level of the second pixel of the two dark reference pixels.

7. The method of claim 1 wherein a first pair of sets of dark reference pixels of the plurality of pairs of sets of dark reference pixels comprises a first group of two or more dark reference pixels and a second group of two or more dark reference pixels.

8. The method of claim 7 wherein the second group of dark reference pixels is adjacent to the first group of dark reference pixels.

9. The method of claim 8 wherein a second pair of sets of dark reference pixels comprises the second group of dark reference pixels and a third group of two or more dark reference pixels, the third group of dark reference pixels being adjacent to the second group of dark reference pixels.

10. The method of claim 1 wherein the dark reference pixels of the image sensor are organized into a plurality of pixel channels and the method comprises estimating respective noise levels of the plurality of pixel channels, wherein the estimated noise level of the dark reference pixels of the image sensor is based on the estimated respective noise levels of the plurality of pixel channels.

11. The method of claim 1 wherein, after each computing of absolute differences in dark signal levels of a pair of sets of dark reference pixels, the accumulated absolute differences are updated.

12. The method of claim 1, comprising determining an average of the accumulated absolute differences in dark signal levels.

13. An image sensor, comprising:
a plurality of active pixels;
a plurality of dark reference pixels; and
processing circuitry coupled to the plurality of dark reference pixels, wherein the processing circuitry, in operation:
sequentially computes, for each of a plurality of pairs of sets of dark reference pixels of the plurality of dark reference pixels, absolute differences in dark signal levels of the plurality of pairs of sets of dark reference pixels;
accumulates the absolute differences in dark signal levels; and
estimates a noise level of the dark reference pixels of the image sensor based on the accumulated absolute differences.

14. The image sensor of claim 13 wherein a first pair of sets of dark reference pixels of the plurality of pairs of sets of dark reference pixels consists of two dark reference pixels.

15. The image sensor of claim 14 wherein the two dark reference pixels are adjacent.

16. The image sensor of claim 13, wherein the processing circuitry, in operation:
- stores an absolute value of a darkness level associated with a first set of a first pair of sets of dark reference pixels;
- computes an absolute difference between a darkness level associated with a second set of the first pair of sets of dark reference pixels and the stored absolute value associated with of the darkness level of the first set of dark reference pixels; and
- initializes the accumulated absolute differences to the computed absolute difference between the darkness level associated with the second set of the first pair of sets of dark reference pixels and the stored darkness level of the first set of dark reference pixels.

17. The image sensor of claim 13 wherein a first pair of sets of dark reference pixels of the plurality of pairs of sets of dark reference pixels comprises a first group of two or more dark reference pixels and a second group of two or more dark reference pixels.

18. The image sensor of claim 17 wherein the second group of dark reference pixels is adjacent to the first group of dark reference pixels.

19. The image sensor of claim 18 wherein a second pair of sets of dark reference pixels comprises the second group of dark reference pixels and a third group of two or more dark reference pixels, the third group of dark reference pixels being adjacent to the second group of dark reference pixels.

20. The image sensor of claim 17 wherein the processing circuitry, in operation:
- stores a sum of dark signal levels of the pixels of the first group of dark reference pixels; and
- computes an absolute difference between a sum of dark signal levels of the pixels of the second group of dark reference pixels and the stored sum of the dark signal levels of the first group of dark reference pixels.

21. The image sensor of claim 13 wherein the dark reference pixels of the image sensor are organized into a plurality of pixel channels and the processing circuitry, in operation, estimates respective noise levels of the plurality of pixel channels, and the estimated noise level of the dark reference pixels of the image sensor is based on the estimated respective noise levels of the plurality of pixel channels.

22. The image sensor of claim 13 wherein, after each computing of absolute differences in dark signal levels of a pair of sets of dark reference pixels, the processing circuitry, in operation, updates the accumulated absolute differences.

23. The image sensor of claim 13 wherein the processing circuitry, in operation, determines an average of the accumulated absolute differences in dark signal levels.

24. The image sensor of claim 13 wherein the image sensor is a color image sensor.

25. A system, comprising:
- an array of pixels including a plurality of active pixels and a plurality of dark reference pixels; and
- processing circuitry coupled to the array of pixels, wherein the processing circuitry, in operation:
  - sequentially computes, for each of a plurality of pairs of sets of dark reference pixels of the plurality of dark reference pixels, absolute differences in dark signal levels of the plurality of pairs of sets of dark reference pixels;
  - accumulates the absolute differences in dark signal levels; and
  - estimates a noise level of the dark reference pixels of the array of pixels based on the accumulated absolute differences.

26. The system of claim 25 wherein a first pair of sets of dark reference pixels of the plurality of pairs of sets of dark reference pixels consists of two dark reference pixels.

27. The system of claim 25 wherein a first pair of sets of dark reference pixels of the plurality of pairs of sets of dark reference pixels comprises a first group of two or more dark reference pixels and a second group of two or more dark reference pixels.

28. The system of claim 25 wherein the dark reference pixels of the array of pixels are organized into a plurality of pixel channels and the processing circuitry, in operation, estimates respective noise levels of the plurality of pixel channels, and the estimated noise level of the dark reference pixels of the array of pixels is based on the estimated respective noise levels of the plurality of pixel channels.

29. The system of claim 25, comprising a back-up camera having an integrated circuit including the array of pixels and the processing circuitry.

30. The system of claim 25, comprising a mobile phone having an integrated circuit including the array of pixels and the processing circuitry.

\* \* \* \* \*